United States Patent
Newmark

(10) Patent No.: US 11,667,382 B1
(45) Date of Patent: Jun. 6, 2023

(54) SYSTEMS AND METHODS FOR UTILIZING UNMANNED VEHICLES TO FACILITATE CLAIMS PROCESSING

(71) Applicant: UNITED SERVICES AUTOMOBILE ASSOCIATION (USAA), San Antonio, TX (US)

(72) Inventor: Jordan Newmark, Fair Oaks Ranch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 362 days.

(21) Appl. No.: 16/746,406

(22) Filed: Jan. 17, 2020

Related U.S. Application Data

(63) Continuation of application No. 14/938,622, filed on Nov. 11, 2015, now Pat. No. 10,538,325.

(60) Provisional application No. 62/077,997, filed on Nov. 11, 2014.

(51) Int. Cl.
| | | |
|---|---|---|
| B64C 39/02 | (2023.01) | |
| H04W 4/40 | (2018.01) | |
| H04W 4/021 | (2018.01) | |
| G06Q 40/08 | (2012.01) | |
| G05D 1/00 | (2006.01) | |
| B64U 101/00 | (2023.01) | |

(52) U.S. Cl.
CPC .......... *B64C 39/024* (2013.01); *G05D 1/0011* (2013.01); *G05D 1/0088* (2013.01); *G06Q 40/08* (2013.01); *H04W 4/021* (2013.01); *H04W 4/40* (2018.02); *B64U 2101/00* (2023.01); *B64U 2201/10* (2023.01); *B64U 2201/20* (2023.01)

(58) Field of Classification Search
CPC combination set(s) only.
See application file for complete search history.

(56) References Cited

U.S. PATENT DOCUMENTS

| | | | | |
|---|---|---|---|---|
| 4,809,178 | A * | 2/1989 | Ninomiya | G05D 1/0255 318/587 |
| 5,742,335 | A * | 4/1998 | Cannon | G01M 11/081 348/135 |
| 8,346,578 | B1 * | 1/2013 | Hopkins, III | G06Q 50/16 705/4 |
| 8,427,632 | B1 * | 4/2013 | Nash | G01C 3/08 356/3.1 |
| 8,577,535 | B2 * | 11/2013 | Cummings | G06F 3/04815 701/23 |
| 8,818,572 | B1 * | 8/2014 | Tofte | G05D 1/12 701/2 |
| 9,129,355 | B1 * | 9/2015 | Harvey | G06T 7/60 |
| 9,131,224 | B1 * | 9/2015 | Freeman | B64C 39/024 |
| 9,407,874 | B2 * | 8/2016 | Laurentino | H04N 7/15 |
| 9,505,494 | B1 * | 11/2016 | Marlow | B64C 39/024 |

(Continued)

*Primary Examiner* — Redhwan K Mawari
(74) *Attorney, Agent, or Firm* — BakerHostetler

(57) ABSTRACT

This disclosure relates to utilizing unmanned vehicles for insurance claim processing. For example, a UAV may be directed to proceed to a target location, which obstructions to avoid and how to avoid them, and what data needs to be gathered about the target. Thus, one or more embodiments described herein relate to navigating to a target location based on receiving a first location of the vehicle and a second location of the target, avoiding obstructions, gathering data about a structure at the target, and initiating an insurance claim.

20 Claims, 4 Drawing Sheets

(56) References Cited

U.S. PATENT DOCUMENTS

| | | | | |
|---|---|---|---|---|
| 9,927,809 | B1* | 3/2018 | Tofte | H04N 21/4227 |
| 10,102,586 | B1* | 10/2018 | Marlow | B64C 39/024 |
| 10,977,734 | B1* | 4/2021 | Kenney | G06Q 40/08 |
| 2005/0004753 | A1* | 1/2005 | Weiland | G06F 16/51 |
| | | | | 701/532 |
| 2008/0078865 | A1* | 4/2008 | Burne | F42B 12/365 |
| | | | | 244/1 R |
| 2009/0265193 | A1* | 10/2009 | Collins | G06Q 30/0185 |
| | | | | 705/4 |
| 2009/0326792 | A1* | 12/2009 | McGrath | G01W 1/08 |
| | | | | 701/120 |
| 2010/0194641 | A1* | 8/2010 | Miller | G01S 11/04 |
| | | | | 342/417 |
| 2010/0215212 | A1* | 8/2010 | Flakes, Jr. | G06K 9/00637 |
| | | | | 382/100 |
| 2012/0086939 | A1* | 4/2012 | Henric | G01J 3/44 |
| | | | | 356/301 |
| 2013/0278427 | A1* | 10/2013 | Setton | G08B 27/00 |
| | | | | 340/584 |
| 2014/0172194 | A1* | 6/2014 | Levien | G08G 5/0091 |
| | | | | 701/2 |
| 2014/0316616 | A1* | 10/2014 | Kugelmass | G06T 11/206 |
| | | | | 701/8 |
| 2014/0344118 | A1* | 11/2014 | Parpia | G06Q 10/087 |
| | | | | 705/28 |
| 2015/0277442 | A1* | 10/2015 | Ballou | G05D 1/0206 |
| | | | | 701/21 |
| 2016/0313736 | A1* | 10/2016 | Schultz | G01S 19/39 |

\* cited by examiner

SYSTEMS AND METHODS FOR UTILIZING UNMANNED VEHICLES TO FACILITATE CLAIMS PROCESSING

RELATED APPLICATION

This application claims priority to and is a continuation of U.S. patent application Ser. No. 14/938,622, filed Nov. 11, 2015, and issue on Jan. 21, 2020, as U.S. Pat. No. 10,538,325 which claims the benefit of U.S. Provisional Application No. 62/077,997 filed Nov. 11, 2014, the contents of which is incorporated herein in its entirety.

BACKGROUND OF THE INVENTION

Unmanned vehicles, such as unmanned aerial vehicles, are being mentioned increasingly frequently as machines that will become more and more commonplace. U.S. Patent Publications 2014/0297065 and 2014/0277842 describe remote controlled devices, and, more particularly, to precisely controlling a remote aerial device for up-close inspection of a subject. However, these disclosures fail to describe the specifics of how an unmanned vehicle could be utilized to facilitate claims processing.

Accordingly, there is an unmet need for utilizing unmanned vehicles to facilitate claims processing.

SUMMARY OF THE INVENTION

One or more embodiments of this disclosure are directed at aspects of utilizing unmanned vehicles, such as unmanned aerial vehicles, to facilitate and/or initiate insurance claims. Aspects of this disclosure are directed at utilizing a vehicle for one or more of the following steps: navigating to a target location based on receiving a first location of the vehicle and a second location of the target; avoiding obstructions disposed on or near the path to the target; gathering data about a structure (e.g., a dwelling) at the target location; and initiating an insurance claim if one or more damage conditions are present and detected in the gathered data.

BRIEF DESCRIPTION OF THE DRAWINGS

So that those having ordinary skill in the art, to which the present invention pertains, will more readily understand how to employ the novel system and methods of the present invention, certain illustrated embodiments thereof will be described in detail herein-below with reference to the drawings, wherein.

A component or a feature that is common to more than one drawing is indicated with the same reference number in each of the drawings.

DETAILED DESCRIPTION OF CERTAIN EMBODIMENTS

Figure 1:
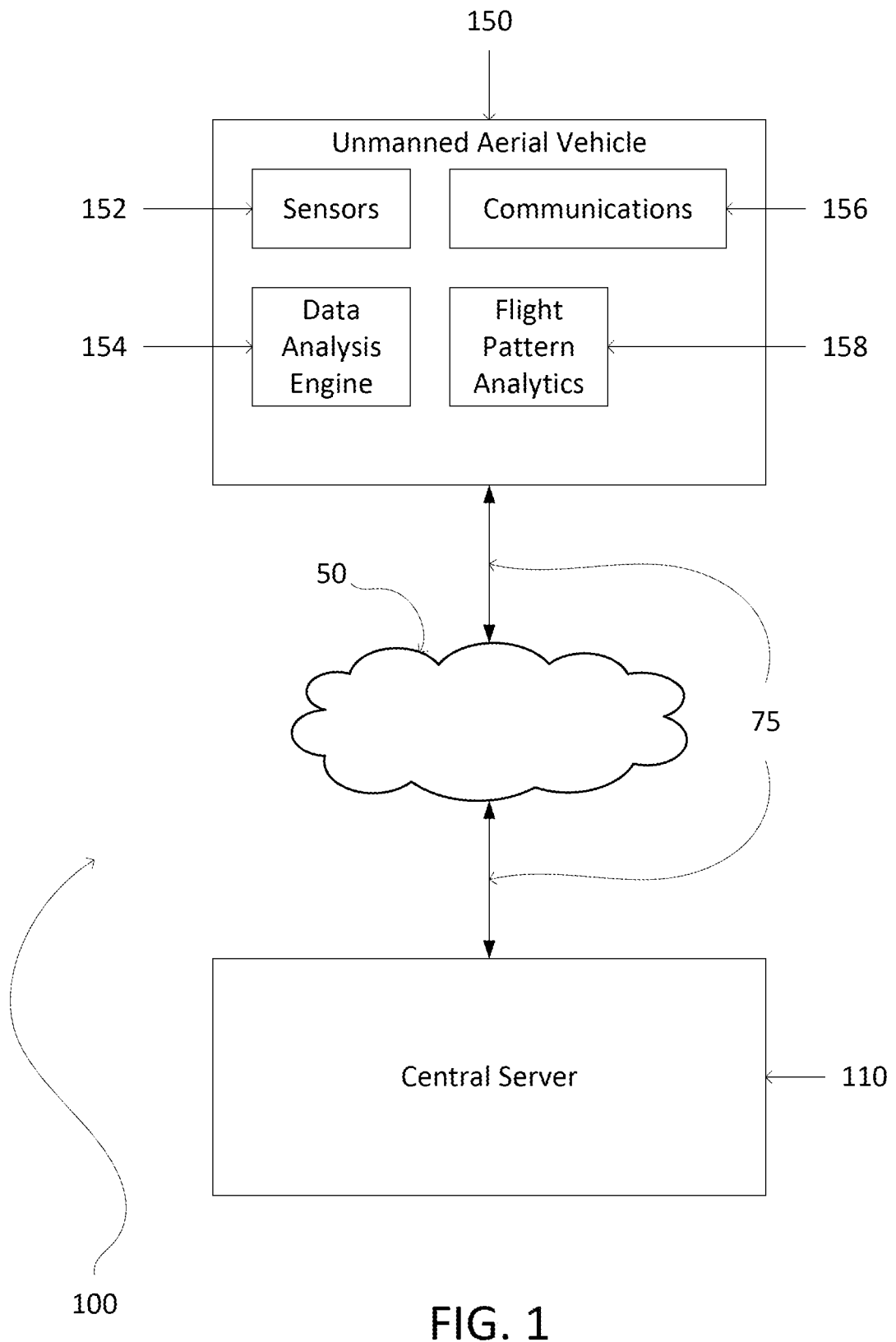
FIG. 1 depicts one embodiment of a system on which this disclosure operates.

The present disclosure is directed to utilizing unmanned vehicles for claims processing and/or claims initiation. It is to be appreciated the subject invention is described below more fully with reference to the accompanying drawings, in which illustrated embodiments of the present invention are shown. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof as known to those skilled in the art, and so forth.

It is to be appreciated that certain embodiments of this invention as discussed below are a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims. Further, although at least one series of steps are presented as an exemplary method of practicing one or more embodiments described herein, it will be appreciated by those skilled in the art that the steps identified may be practiced in any order that is practicable, including without limitation the omission of one or more steps.

An unmanned vehicle may be remotely controlled via wireless communications to assist in claims processing and claims initiation. The individual(s) operating the vehicle may want to gather data about an object covered by an insurance policy. When the vehicle arrives at or near the object(s) to be inspected, the vehicle may enter into an observation mode. Thus, the vehicle will gather data about a property at a location, such as by generating imagery from one or more positions around the location. The vehicle may then analyze the gathered data to determine if any of the data is indicative of damage to the property, and if any damage is indicated, communicate the data to a central location (e.g., server, cloud network). It is contemplated herein that the communicated data may include all of the gathered data, only the data indicative of damage having occurred, and/or any combination or subset thereof. Finally, the vehicle and/or the computing device (e.g., server, cloud network) that the vehicle is communicating with may initiate an insurance claim directed at the damage(s) to the property that the vehicle either directly detected (e.g., a missing roof) and/or that the vehicle implicitly inferred (e.g., a missing window would not only directly indicate that the window needed to be replaced, but it would also implicitly indicate the possibility of wind/water damage inside that room and/or other rooms in that structure).

For example, if the vehicle is an aerial vehicle that has the capability to hover in a stationary and/or mostly stationary position, the vehicle may be instructed to do so. So if the Unmanned Aerial Vehicle (UAV) needs to inspect a house for damages after a weather event (e.g., hurricane, tornado), the UAV may locate itself at a stationary airborne position that allows the UAV to gather information about the object.

The UAV may include one or more sensors to gather data. For exemplary purposes only and without limitation, the UAV's sensors may include a camera that captures visible light (e.g., still images and/or video), a microphone to collect audio data, a camera that captures wavelengths other than visible light (e.g., infrared), a radar emitter and detector, a particle sensor that detects compounds and/or elements that are present in the air and/or on objects, a temperature sensor, a humidity sensor, a pressure sensor to detect atmospheric pressure, a light sensor, and/or any other sensors as would be recognized by those skilled in the art.

Figure 3:
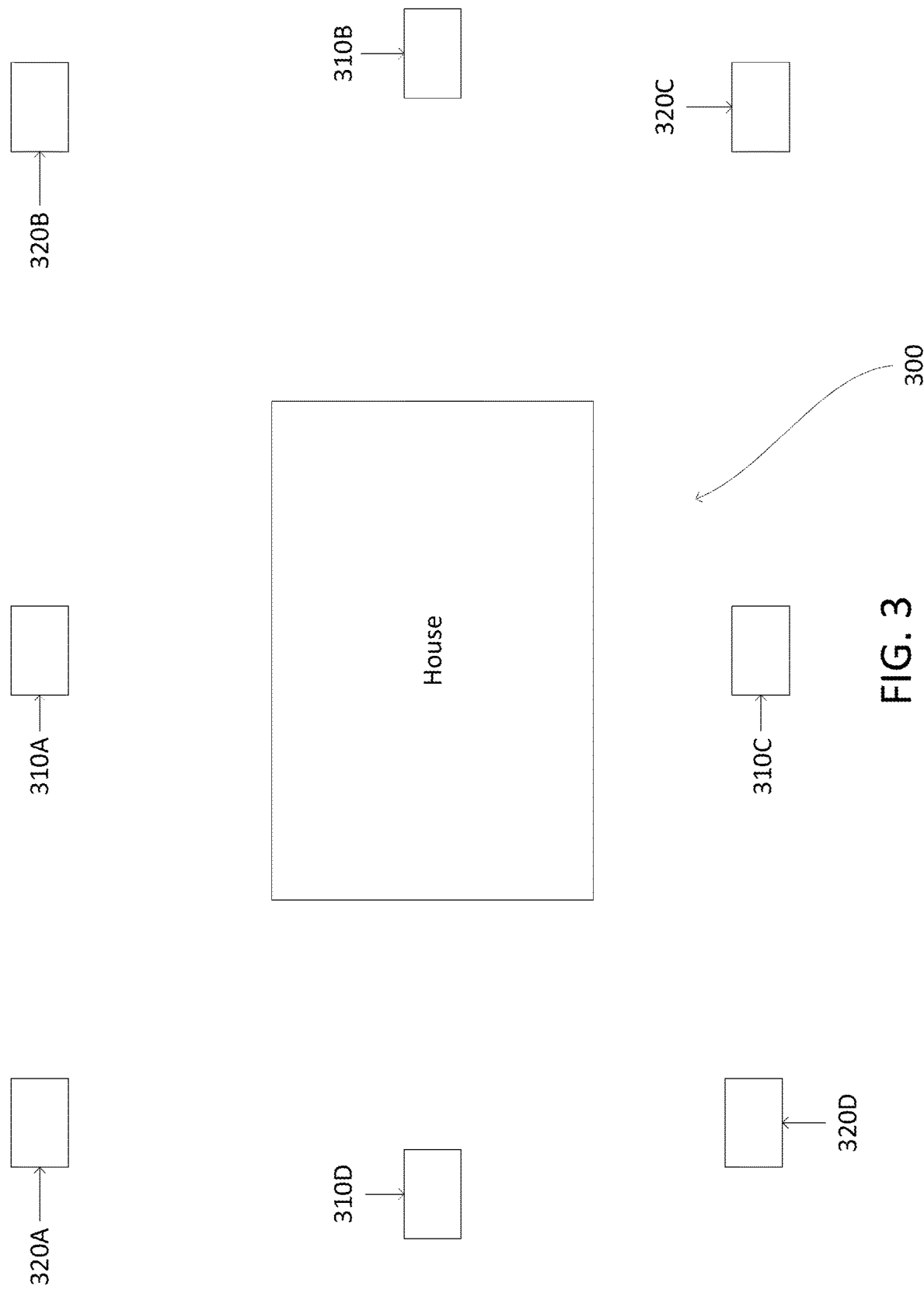
FIG. 3 depicts exemplary data gathering locations that may be utilized by the system of FIG. 1.

Further, after the UAV arrives at the position at and/or near a target property, the UAV may be instructed to identify a plurality of locations from which it may observe the object. For example, when inspecting a home, in one exemplary method for conducting reconnaissance, the UAV may typically and initially first locate itself at 4 different locations, such as locations 310A, 310B, 310C, and 310D shown in FIG. 3, and locations 320A, 320B, 320C, and/or 320D may be utilized as secondary observational locations. Optionally, the initial reconnaissance locations may be 320A, 320B, 320C, and 320D shown in FIG. 3.

It is contemplated herein that the above-identified locations may be where the UAV hovers and/or stays relatively still while one or more pieces of data are collected (e.g., visual light via a still image and/or a video). It is further contemplated herein that the above-identified locations may be locations that the UAV traverses at a regular and/or typical traveling speed while the one or more pieces of data are collected.

While gathering data, the UAV may include general guidelines to maintain a specific altitude and/or an altitude range for those locations. For example, the UAV may take the initial images at an altitude of 100 feet. It is contemplated herein that the UAV may operate at an altitude that is at least partially dependent on which sensors are being utilized. For example, if visible light is being measured then the altitude is determined based on requiring the visible light camera not having to take imagery larger than a predetermined distance (e.g., 150 feet), and if the infrared sensor is being utilized then the altitude may be determined based on a different imagery distance (e.g., 75 feet), and/or if the microphone is being utilized then the altitude may be calculated and determined based on yet another data measurement distance (50 feet).

The UAV may be remotely operated by a controller. To facilitate operating the UAV, the controller may receive data from the UAV such as imagery, and/or a map depicting nearby objects (such as relative to the UAV).

The controller may micro-manage the UAV (e.g., specific directions regarding speed, height, and/or direction), and/or generally operate the UAV. For exemplary purposes only and without limitation, the controller may select an object and/or property to inspect and the UAV determines the method of traveling to and/or around that object and/or property. It is further contemplated herein that the controller may select a relative location (e.g., locations 310D and/or 310B) and the UAV may determine the method of traveling to the one or more selected locations relative to the object and/or property being inspected.

To navigate to the target position at and/or near the property/properties (this example will proceed with the singular "property", although it is contemplated herein that this methodology could be extrapolated and applied to multiple properties) to be inspected, the UAV may receive the position of the property to be inspected and the position of the UAV. Based on the combination of these two position data points, the UAV may first calculate and then navigate to the position of the property. While navigating to the property, the UAV may receive an instruction to avoid one or more obstructions, known or unknown, that may be at or near the path between the UAV and the target location.

In one embodiment, the controller may select a property to inspect, and the UAV may determine an initial reconnaissance pattern and, based on data gathered initially, the UAV may itself determine additional reconnaissance patterns. For example, if the UAV initially receives data on the initial recon that identifies visible damage to the roof of a property, the UAV may conduct additional recon via infrared detection (such as from a closer distance).

The UAV may include Global Positioning System (GPS) measurements that inform the UAV where it is located. This information may be utilized to manage and/or generate navigation for the UAV.

The UAV may include a stabilization functionality and/or engine that assists the UAV in gathering data. This stabilizing functionality may be general to the UAV entirely (e.g., gyroscopes to help level the UAV), and/or specific to one or more sensors. For example, it is contemplated herein that the stabilizing module may be on a platform of the UAV that houses one or more sensors (e.g., camera(s)). The stabilizing functionality may be constantly enabled as the UAV is being operated, and/or it may only be engaged when the UAV is gathering data.

In addition to and/or alternative to radar, it is contemplated herein that the UAV may have other proximity sensors as would be recognized by those skilled in the art. For exemplary purposes only and without limitation, the UAV may use three dimensional imagery to determine the location of other objects, radar, lasers, and/or any means as known in the art. The UAV may utilize the determined and/or estimated location of other objects to assist the UAV while navigating. For example, if the UAV is collecting data about one or more insured properties (real and/or personal), the UAV may determine that an object (e.g., a tree, a tower) is either in the way for where the UAV wants to go and/or too close to the path that the UAV wants to traverse.

In one example, the UAV receives an instruction to gather data about a property. The UAV receives and/or generates itself a navigational plan to arrive at the property, and as the UAV navigates to the property the UAV may make measurements to determine where objects (e.g., trees) are. If the UAV determines that another object (e.g., another flying object) is and/or will be dangerously close to the UAV (e.g., closer than a predetermined threshold), then the UAV may alter and/or pause its navigational plan.

The UAV may be instructed to travel at a selected rate of speed. It is contemplated herein that this rate of speed may be with respect to the surrounding air and/or with respect to the ground. After being instructed to travel at the selected speed, the UAV may monitor surrounding items (e.g., the air, the ground) to dynamically and/or constantly determine the UAV's rate of speed at a given moment in time.

Referring to FIG. 1, illustrated therein is an exemplary system that utilizes one or more embodiments described herein. System 100 includes unmanned aerial vehicle 150 and central server 110. In one embodiment, unmanned aerial vehicle 150 includes sensors 152, data analysis engine 154, communications 156, and flight pattern analytics 158.

Figure 2:
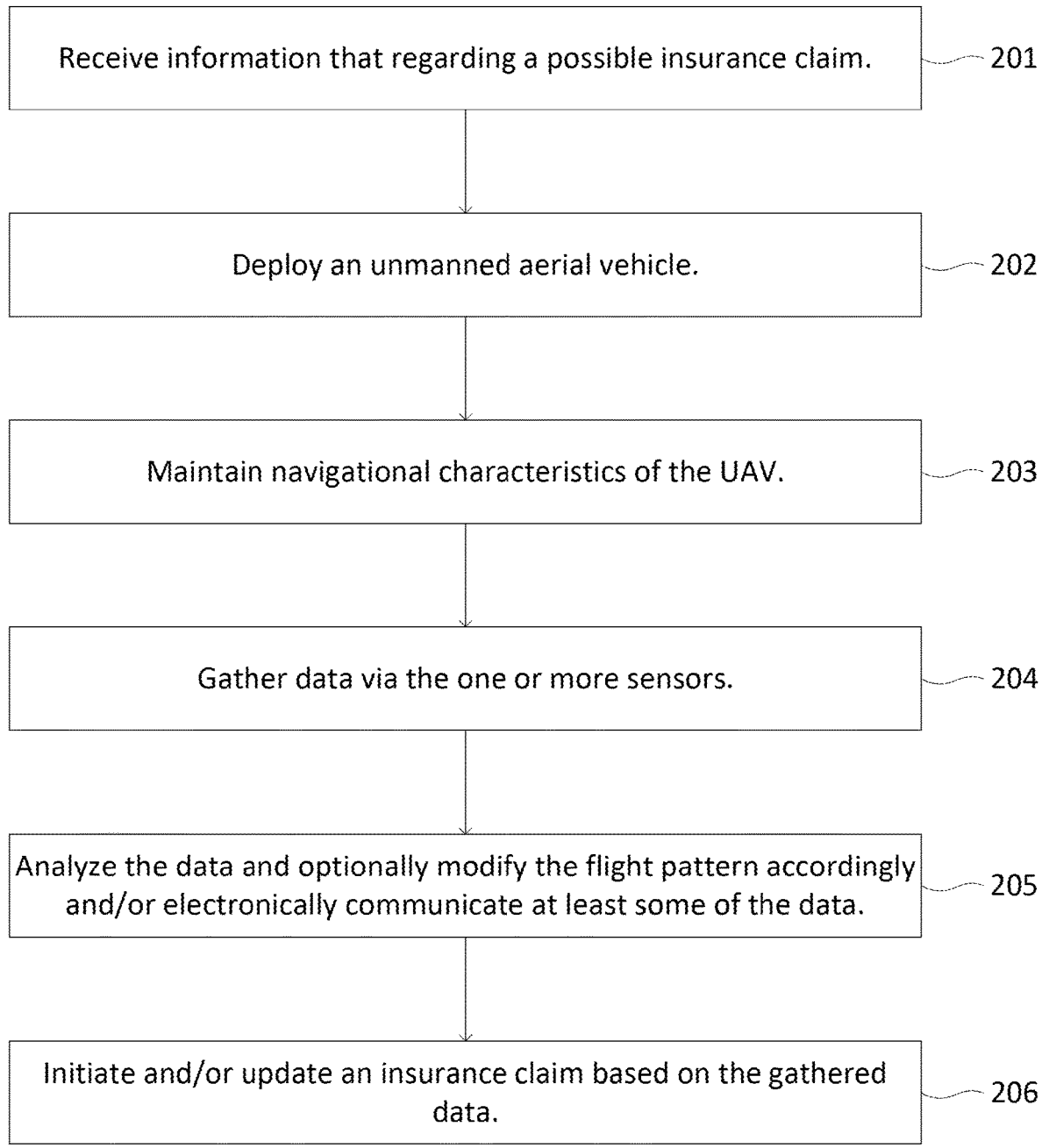
FIG. 2 is a flowchart depicting illustrative operation of the system of FIG. 1.

Turning to FIG. 2, illustrated therein is an exemplary method 200 of utilizing one or more embodiments described herein. Starting at step 201, information is received regarding a insurance claim. This information may be related to a claim being initiated, and/or this information may be related to an anticipated claim (e.g., a hurricane is forecasted to transit a designated area). In response to this information, a UAV is deployed (step 202). The UAV maintains flight characteristics (step 203) and gathers data via the one or more sensors affixed and/or coupled to the UAV (step 204). The gathered data is analyzed (step 205) and optionally the UAV's flight pattern is modified and/or appended. Finally, an insurance claim is initiated and/or updated based on the gathered data, which preferably, although not necessarily, includes data relating to a damaged structure at a target location that the UAV was directed to (step 206).

In one exemplary use case, a UAV is dispatched to a location via two spatial position data points being transmitted to the UAV. The first location data point relates to a location of the UAV (e.g., a GPS location of where the UAV presently is, a GPS location of where the UAV is near, a GPS location of where the UAV is expected to be located, a relative location of where the UAV is at or near (e.g., a delta of the difference in the location of the UAV as compared to a, preferably known, location of another object)). The second location data point may relate to a target location. The target location can be, for exemplary purposes only and without limitation, a property that is insured, a property that contains a structure (e.g., a dwelling) that is insured), an area located at or near a property/dwelling that is insured, an area near a plurality of properties and/or dwellings that are insured.

Continuing with this exemplary use case, the UAV may be provided with a first instruction to traverse from the first spatial data point to the second spatial data point, as well as being provided a second instruction to avoid one or more (proximal) obstructions that may be in a path and/or near a path between the first and second locations (that the UAV may need to or may be considering traversing). These instructions to avoid the obstructions may relate to anticipatory avoidance (e.g., the UAV not even coming close to approaching the obstruction), and/or they may relate to reactionary guidelines (e.g., avoidance maneuvers should default to an increase in altitude for aerial vehicles).

Referring further to FIG. 1, it is to be appreciated that network 50 depicted in FIG. 1 may include a local area network (LAN), a wide area network (WAN), a personal area network (PAN), and/or combinations thereof. Such networking environments are commonplace in offices, enterprise-wide computer networks, intranets, and the Internet. For instance, when used in a LAN networking environment, the system 100 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the system 100, or portions thereof, may be stored in a remote memory storage device such as storage medium. Communication links 75 may comprise either wired or wireless links. It is to be appreciated that the illustrated network connections of FIG. 1 are exemplary and other means of establishing a communications link between multiple devices may be used.

Figure 4:
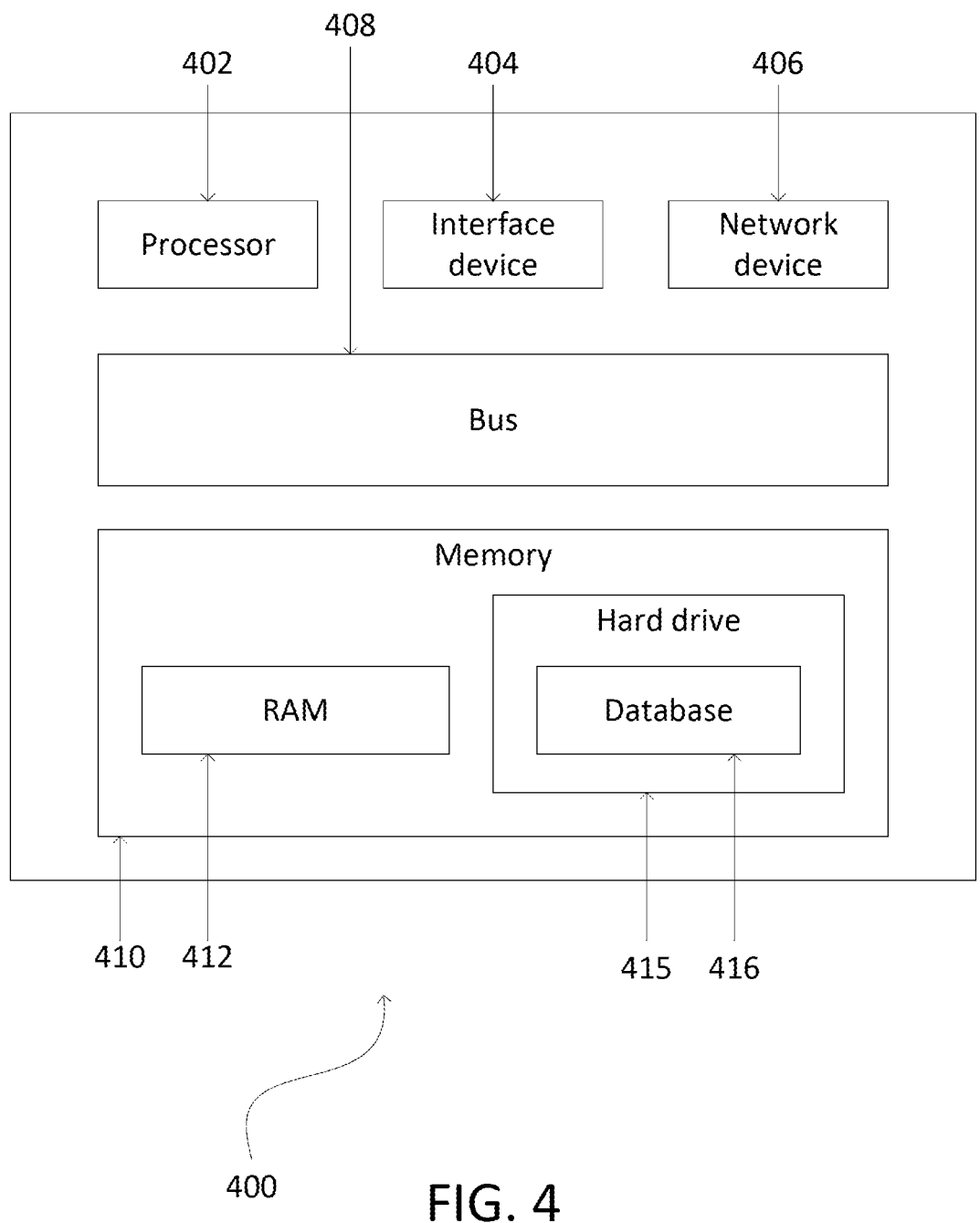
FIG. 4 depicts an exemplary computing device such as may be used with this disclosure.

Referring to FIG. 4, illustrated therein is an exemplary embodiment of a computing device as might be used when utilizing the systems and methods described herein. In one embodiment, computing device 400 includes memory 410, a processor 402, an interface device 404 (e.g., mouse, keyboard, monitor), a network device 406. Memory 410 in one example comprises a computer-readable signal-bearing medium. One example of a computer-readable signal-bearing medium comprises a recordable data storage medium, such as a magnetic, optical, biological, and/or atomic data storage medium. In another example, a computer-readable signal-bearing medium comprises a modulated carrier signal transmitted over a network coupled with system 100, for instance, a telephone network, a local area network ("LAN"), the Internet, and/or a wireless network. In one example, memory 410 includes a series of computer instructions written in or implemented with any of a number of programming languages, as will be appreciated by those skilled in the art.

Memory 410 in one example includes RAM 412, hard drive 415, which may include database 416. Database 416 in one example holds information, such as information that relates to users and/or parties interacting with system 100.

Although this disclosure repeatedly refers to UAV (unmanned aerial vehicles), it is contemplated herein that the spirit and material in this disclosure could be applied to and practiced by any number of other vehicles, including manned vehicles, non-aerial vehicles, etc.

The terms "engine" and "module" denote a functional operation that may be embodied either as a stand-alone component or as an integrated configuration of a plurality of subordinate components. Thus, engines and modules may be implemented as a single engine/module or as a plurality of engine/modules that operate in cooperation with one another. Moreover, engines/modules may be implemented as software instructions in memory 310 or separately in any of hardware (e.g., electronic circuitry), firmware, software, or a combination thereof. In one embodiment, engines/modules contain instructions for controlling processor 302 to execute the methods described herein. Examples of these methods are explained in further detail in the subsequent of exemplary embodiments section-below.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the subject invention.

What is claimed is:

1. A method comprising:
causing an unmanned vehicle to deploy to an area associated with a plurality of properties;
determining that ongoing damage is occurring to a first property of the plurality of properties, wherein the ongoing damage is changing an amount of damage to the first property with time;
determining, based on the ongoing damage to the first property of the plurality of properties, a first priority associated with the first property, wherein additional damage is expected due to the ongoing damage, and wherein the first priority is based at least in part on gathering content associated with the ongoing damage to the first property;
determining, based on damage not currently occurring to a second property of the plurality of properties, a second priority associated with the second property;
determining that the second priority is higher than the first priority based on the changing of the amount of damage to the first property; and
gathering, by the unmanned vehicle and based on the first priority and the second priority, data associated with the second property.

2. The method of claim 1, further comprising gathering data associated with the second property after gathering data associated with the first property.

3. The method of claim 1, wherein the ongoing damage to the first property comprises at least one of fire damage, water damage, seismic damage, or wind damage, and wherein the ongoing damage comprises currently occurring damage to the first property.

4. The method of claim 1, wherein the unmanned vehicle comprises an aerial vehicle.

5. The method of claim 1, wherein the data associated with the second property comprises at least one of thermal data, humidity data, gas data, audio data, or radar data.

6. The method of claim 1, wherein the data associated with the second property comprises at least one of particle data, light data, or pressure data and wherein the first property and the second property are different.

7. The method of claim 1, wherein the determining the first priority and the determining the second priority comprise determining the first priority and determining the second priority by the unmanned vehicle.

8. A non-transitory computer-readable medium storing instructions that, when executed, cause operations comprising:
causing an unmanned vehicle to deploy to an area associated with a plurality of properties;
determining that ongoing damage is occurring to a first property of the plurality of properties, wherein the ongoing damage is changing an amount of damage to the first property with time;
determining, based on the ongoing damage to the first property of the plurality of properties, a first priority associated with the first property, wherein additional damage is expected due to the ongoing damage, and wherein the first priority is based at least in part on gathering content associated with the ongoing damage to the first property;
determining, based on damage not currently occurring to a second property of the plurality of properties, a second priority associated with the second property;
determining that the second priority is higher than the first priority based on the changing of the amount of damage to the first property; and
gathering, by the unmanned vehicle and based on the first priority and the second priority, data associated with the second property.

9. The non-transitory computer-readable medium of claim 8, wherein the operations further comprise gathering data associated with the second property after gathering data associated with the first property.

10. The non-transitory computer-readable medium of claim 8, wherein the ongoing damage to the first property comprises at least one of fire damage, water damage, seismic damage, or wind damage and wherein the ongoing damage comprises currently occurring damage to the first property.

11. The non-transitory computer-readable medium of claim 8, wherein the unmanned vehicle comprises an aerial vehicle.

12. The non-transitory computer-readable medium of claim 8, wherein the data associated with the second property comprises at least one of thermal data, humidity data, gas data, audio data, or radar data.

13. The non-transitory computer-readable medium of claim 8, wherein the data associated with the second property comprises at least one of particle data, light data, or pressure data and wherein the first property and the second property are different.

14. The non-transitory computer-readable medium of claim 8, wherein the determining the first priority and the determining the second priority comprise determining the first priority and determining the second priority by the unmanned vehicle.

15. A computing device comprising:
one or more processors; and
memory storing instructions that, when executed by the one or more processors, cause the computing device to:
cause an unmanned vehicle to deploy to an area associated with a plurality of properties;
cause the unmanned vehicle to collect content related to a first property of the plurality of properties;
determine, based on the content, that ongoing damage is occurring to the first property of the plurality of properties, wherein the ongoing damage is changing an amount of damage to the first property with time;
determine, based on the ongoing damage to the first property of the plurality of properties, a first priority associated with the first property, wherein additional damage is expected due to the ongoing damage, and wherein the first priority is based at least in part on gathering content associated with the ongoing damage to the first property;
determine, based on damage not currently occurring to a second property of the plurality of properties, a second priority associated with the second property;
determine that the second priority is higher than the first priority based on the changing amount of the damage to the first property; and
gather, by the unmanned vehicle and based on the first priority and the second priority, data associated with the second property.

16. The computing device of claim 15, wherein the instructions further cause the computing device to gather data associated with the second property after gathering data associated with the first property.

17. The computing device of claim 15, wherein the ongoing damage to the first property comprises at least one of fire damage, water damage, seismic damage, or wind damage and wherein the ongoing damage comprises currently occurring damage to the first property.

18. The computing device of claim 15, wherein the unmanned vehicle comprises an aerial vehicle.

19. The computing device of claim 15, wherein the data associated with the second property comprises at least one of thermal data, humidity data, gas data, audio data, or radar data.

20. The computing device of claim 15, wherein the data associated with the second property comprises at least one of particle data, light data, or pressure data and wherein the first property and the second property are different.

* * * * *